US005590221A

United States Patent [19]
Newton

[11] Patent Number: 5,590,221
[45] Date of Patent: Dec. 31, 1996

[54] IMAGING METHOD AND SYSTEM CONCATENATING IMAGE DATA VALUES TO FORM AN INTEGER, AND PARTITIONING THE INTEGER

[76] Inventor: Dale C. Newton, 986 Cobblestone Dr., Orange Park, Fla. 32073

[21] Appl. No.: 219,827

[22] Filed: Mar. 30, 1994

[51] Int. Cl.[6] .................................................. G06T 9/00
[52] U.S. Cl. ........................ 382/232; 382/305; 382/309
[58] Field of Search ..................................... 382/309, 232, 382/305, 247; 358/261.1, 405, 435, 426; 371/37.1, 37.4, 48, 67.1, 72, 54; 380/20, 54

[56] References Cited

U.S. PATENT DOCUMENTS 3,745,525  7/1973  Hong et al. ........................... 371/40.3
3,996,558  12/1976  Heun ..................................... 371/54
4,360,840  11/1982  Wolfrum et al. ................... 358/261.1
4,555,803  11/1985  Hirose ................................... 382/305

*Primary Examiner*—Joseph Mancuso
*Assistant Examiner*—Jon Chang
*Attorney, Agent, or Firm*—Charles A. McClure

[57] ABSTRACT

Imaging method and system useful for medical and other imaging. An image field is scanned as an array to yield a succession of values of optical density or other characteristic of interest. The resulting numerical values in preferably digital form are linked end to end to provide a large integral number, which is partitioned into a set of ordered numerical terms summing to the same number. Stored values are retrieved directly or by computation upon command and are processed and applied inversely to reconstitute the scanned values, from which a replica of the original image field is easily produced.

22 Claims, 4 Drawing Sheets

FIG. 2

| 1 | 2 |
|---|---|
| 4 | 3 |

DECIMAL

| 00000001 | 00000010 |
|---|---|
| 00000100 | 00000011 |

BINARY (8-BIT)

ARRAYED VALUES

SCAN ARRAY FROM CELL 1:

(A) 1,2,3,4    00000001, 00000010, 00000011, 00000100
    (CLOCKWISE)

(B) 1,4,3,2    00000001, 00000100, 00000011, 00000010
    (COUNTER CLOCKWISE)

(C) 1,2,4,3    00000001, 00000010, 00000100, 00000011
    (ROWS, LEFT TO RIGHT)

(D) 1,4,2,3    00000001, 00000100, 00000010, 00000011
    (COLUMNS, DOWN)

(E) 1,3,2,4    00000001, 00000011, 00000010, 00000100
    (DIAGONALS, DOWN)

(F) 1,3,4,2    00000001, 00000011, 00000100, 00000010
    (DIAGONALS DOWN, DIAGONALS UP)

ALSO SIX SIMILAR SCANS FOR THIS ARRAY STARTING FROM EACH OTHER CELL.

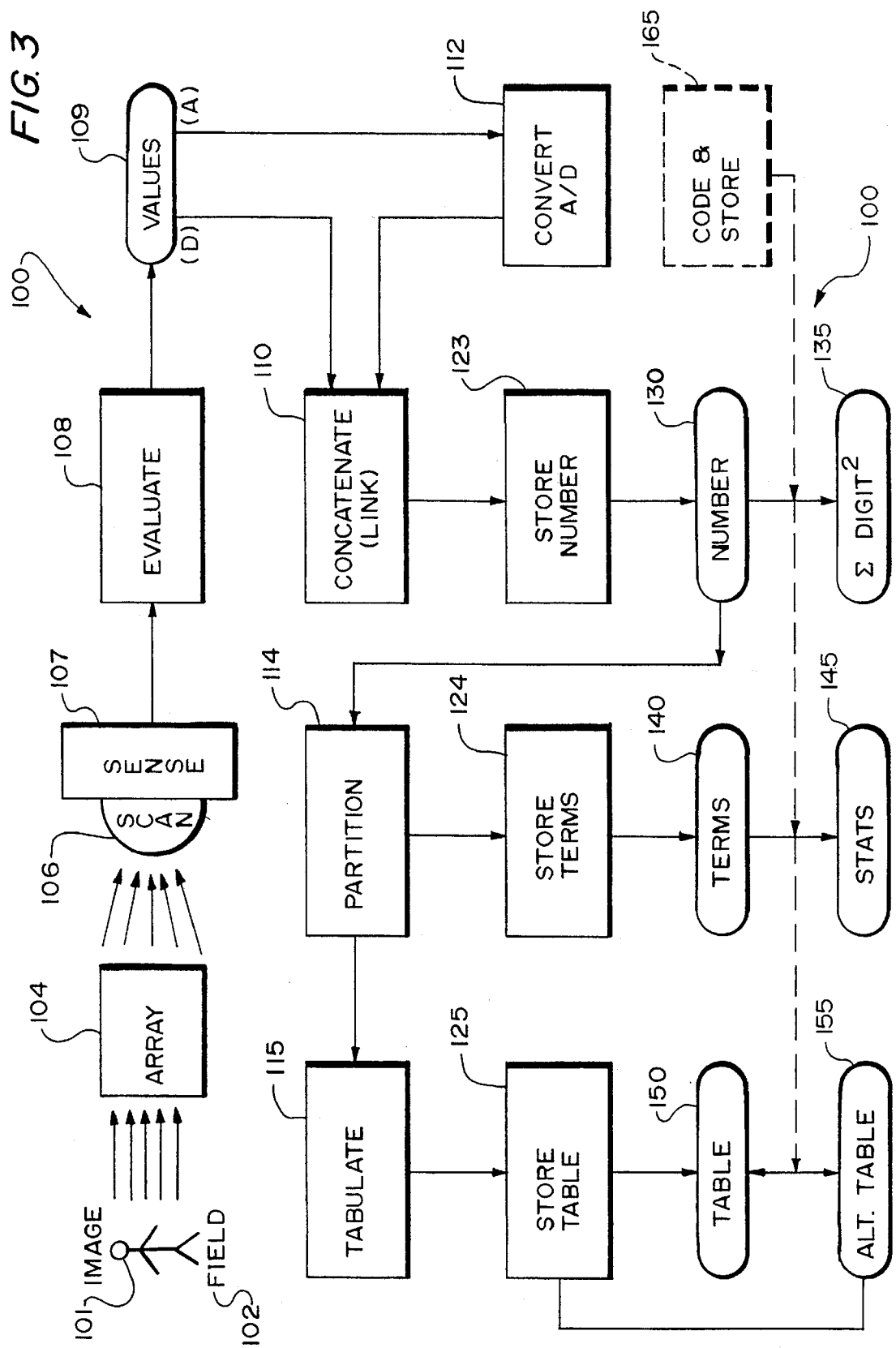

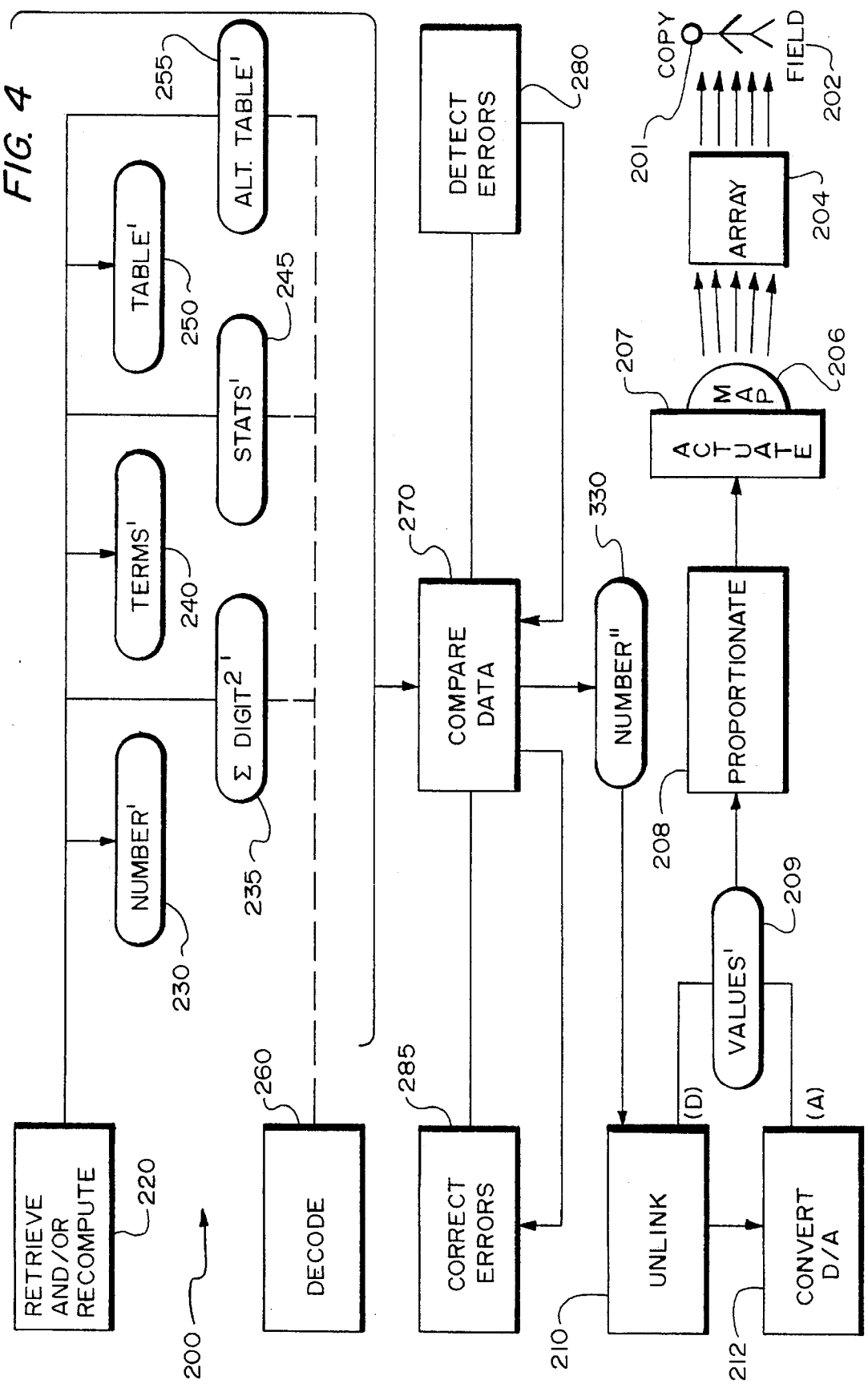

IMAGING METHOD AND SYSTEM CONCATENATING IMAGE DATA VALUES TO FORM AN INTEGER, AND PARTITIONING THE INTEGER

TECHNICAL FIELD

This invention relates to an imaging method and system, such as is useful for viewing and reviewing medical or similar image fields, being especially useful in the storage and retrieval of such images.

BACKGROUND OF THE INVENTION

Medical advances plus computer improvements have facilitated medical image storage and retrieval. Whether images are derived as analog or digital data, their computer storage in digital form is customary, regardless of the diverse methods of originating them, and even though film or paper copies may be made and stored as well.

Conversion of analog data to digital (A/D) is common, whereupon reconversion from digital data to analog (D/A) is customary, as is D/A conversion of data originated in digital form, because the human eye and brain are so well suited to detecting and interpreting fine gradations in analog data but less apt in dealing with digital data.

Conversion and transmittal of data are susceptible to error. Unlike an entertainment image, a medical image requires a high level of identity with the original because an abnormality in a medical image may be critical and is difficult enough to interpret without being complicated by possible degradation of the image.

Yet methods of image conversion or of storage and retrieval may be required to handle such large volumes of data that toleration of errors may tend to become a tradeoff for prompt handling of images.

Examples of imaging problems and remedies are suggested in U.S. patents, by Ichihara in U.S. Pat. No. 4,864, 500; Hopkinson in U.S. Pat. No. 4,939,645; Tawara et al. in U.S. Pat. No. 4,958,283; and John in U.S. Pat. No. 5,027, 817.

SUMMARY OF THE INVENTION

My invention provides methods for substantially lossless data conversion, storage, and retrieval, especially but not exclusively in medical imaging, as by a system of digital processing components.

A primary object of the present invention is to process image data so as to enable an image to be replicated extremely accurately.

Another object of this invention is to provide a novel numeric method of representing an image and of processing such numeric representation for storage and retrieval of the image.

A further object of the invention is to provide for detection and correction of errors arising in data conversion or transmission.

Other objects of the present invention, together with means and methods for attaining the various objects, will become apparent from the following description and the accompanying diagrams of preferred embodiments presented here by way of example rather than limitation.

In general, the present invention measures (i.e., evaluates) a characteristic of interest, such as optical density, at successive locations within an image field, as via an orderly scanning method. The image array may be mainly one-dimensional and/or linear, as in the instance of text, but usually occupies two or more dimensions (e.g., x-ray radiograph, CAT scan, or MRI scan), especially where a physiological process, such as cell division or blood circulation, is being observed over the non-spatial dimension of time. Values not already digital are converted from analog to digital (A/D) form for readier processing. Successive resulting image data values from a convenient scanning path (over part or all of an image field) and duration (a millisecond or other fractional part of a second) are concatenated (linked end-to-end) to make up image data integral numbers for subsequent processing according to the invention. One or more such numbers undergo other mathematical transformations.

More particularly, according to this invention, an evaluative scanning of an image field is accomplished, providing a succession of image data values in numeric form. That succession of numbers is concatenated to form at least one integral number. Then each such number is partitioned into a monotonic (ordered) set of component numbers summable to the given partitioned number. More than one partitioning of the same image data integral number can be performed for subsequent cross-checking or error-detection purposes. Other conversions for purposes of error detection and correction may involve statistical analysis of the partition terms and/or such other steps as base shifting, exponentiation, unlinking, etc.

At retrieval each number is reconstituted, essentially by doing the inverse of the conversion procedure as described. Re-conversion enables an inverse of the evaluative scanning to be accomplished, retracing the scanning path throughout the array and replicating the associated values of the optical density or other characteristic of interest at the corresponding pixel locations. This procedure gives an identical likeness or replica of the given original image field. The image resolution is dependent upon the instrumental granularity (e.g., 8-bit, 16-bit, 32-bit, 64-bit, or higher). A resulting image may be displayed in transitory form, (e.g., on a video screen) or in a more nearly permanent form (e.g., as a printout on paper or film).

This invention also includes steps of error detection and error rectification, performable upon image data values in numerical form, before or after conversion or re-conversion (or both), so as to prevent acceptance of retrieved versions if erroneous or incomplete. Detection techniques are suitable at diverse stages in the overall conversion or reconversion, and may be provided by using different starting points or sequencing. With a succession of values obtained by one pattern of scanning an image field, error detection may be accomplished conveniently by comparing the values from that pattern with the values from another scanning pattern of the array, after offsetting differences due to scanning order. Error correction is conveniently based upon prearranged cross-checking comparison of the outcomes of several alternative paths to wherever an error is noted, followed by selecting values corroborated by their mutual agreement.

SUMMARY OF THE DRAWINGS

FIG. 2 is a schematic showing of a 2×2 image matrix, together with numerical versions of results of different scanning orders.

FIG. 3 is a schematic flow diagram representative of steps of this invention to and including storage of image data; and FIG. 4 is a similar schematic flow diagram representative of steps for retrieving a stored image according to this invention.

DESCRIPTION OF THE INVENTION

This invention utilizes the concept of partitioning a number into a set of smaller numbers (each different from every other one) called "terms"—whose sum is the partitioned number. For example, the numbers 1, 2, 3, 4, and 5 in our usual decimal system add up to the number 15, so those five smaller numbers make up a partition of the larger number. They are uniquely its fundamental partition, being a closed or "fully packed" sequence, starting at number 1. Other partitions of the number 15 (made up of two or more integers smaller than 15) include looser sequences such as (i) 3, 4, 8; and (ii) 6, 9. The number 15 has more than two dozen partitions, each conveniently represented as terms in given order (monotonic) along a number line or spectrum in a preferred number base. The usual bases are decimal and binary. Bases such as 8 (octal), 12 (duodecimal) or 16 (hexadecimal), can be useful in error detection/correction, etc.

More compact shorthand representation of partitions is useful. A preferred notation is $[n,N]_{alpha}^{omega}$ where n is the number of terms, N the partitioned number, alpha and omega the first and last terms. The five-member partition of 15 is $[5,15]_1^5$, whereas the other two examples noted above are (i) $[3,15]_3^8$ and (ii) $[2,15]_6^9$. The first partition is packed (i.e., no number is omitted from alpha to omega), and may be underlined between the brackets to indicate packing, thus: $[5,15]_1^5$. This partition is also fully packed, as its alpha=1. The general formula $N=(n^2+n)/2$ yields number N, with n fully packed terms. Hence, $(5^2+5)/2=30/2=15$. Integers suffice as exemplary here; fractions can be handled as reciprocal terms; and negative numbers can be treated separately by prefixing a negative sign to each such number.

According to this invention, an image field is scanned as an array (e.g., orthogonal x,y) in a selected order of picture elements (pixels) by a suitable sensing system whose granularity matches the desired resolution. Evaluation of sensed data gives measured values for respective pixel locations, and a succession of numerical values for the entire array. A commonly sensed characteristic is optical density, for which the scanning sensor is a photodiode or the like. Other examples include color, conductivity (electrical or thermal), and temperature, for all of which suitable sensors are well known.

Figure 1:
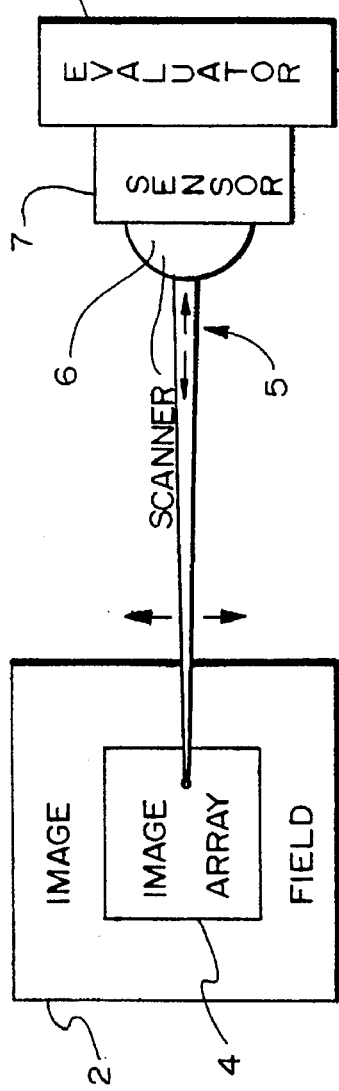
FIG. 1 is a largely schematic or block diagram of apparatus components useful in practicing the steps of the present invention.
Figure 1:
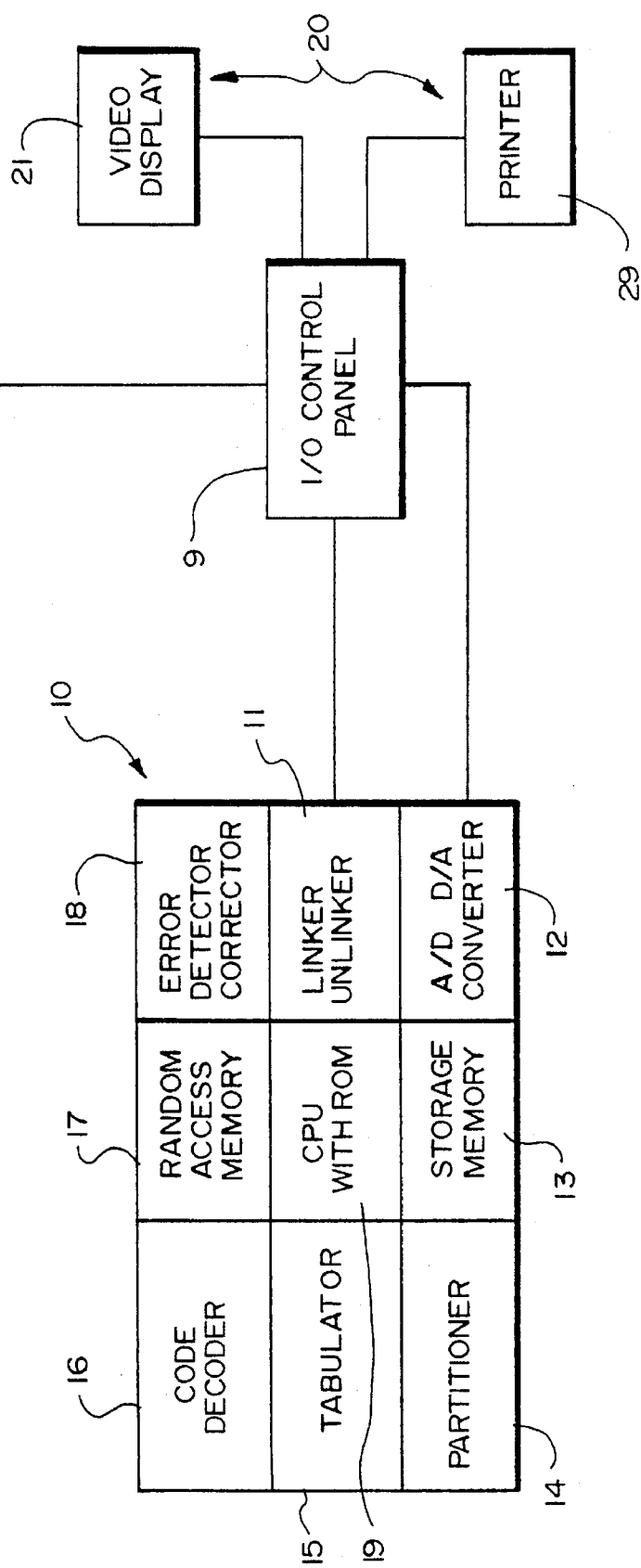

FIG. 1 shows schematically apparatus of the present invention, including interconnected (i) imaging components group 5 (at top); (ii) storage, computation, and retrieval components group 10 (lower left; and (iii) display components group 20 (lower right).

IMAGE FIELD 2 (at upper left) is subdivisible into one or more scannable portions—one being identified here as IMAGE ARRAY 4—by SCANNER 6, itself adapted to sweep arrays as a succession of pixels in an ordered manner, such as horizontally and vertically (arrows). SENSOR 7 and EVALUATOR 8 are adapted to measure numerically a given characteristic of interest at each successive pixel scanned and thus to output a resulting succession of numerical image data. Streams of image data from imaging components group 5 are fed to components group 10—often called simply "the computer" here—via intervening I/O CONTROL PANEL 9, which enables an operator to direct and review computer operations and to select and view image displays. A stream of image data is forwarded from the CONTROL PANEL to the computer via LINKER/UNLINKER 11 (adapted to concatenate it) and/or by A/D D/A CONVERTER 12 (adapted to convert to a preferred number base—usually binary—whatever input image data may be in non-preferred form).

In addition to the last two mentioned components, the computer group comprises basic component 19: CPU (central processing unit) with ROM (read-only memory), and STORAGE MEMORY 13, and also RANDOM ACCESS MEMORY (RAM) 17. RAM is a transitory working space, whereas ROM is a permanent source of control data or directions, and the other memory is a semi-permanent repository of image-related data.

Adjunct components for numerical processing include PARTITIONER 14, TABULATOR 15, CODER/DECODER 16, and ERROR DETECTOR/CORRECTOR 18.

Also connected to the computer via I/O CONTROL PANEL 9 are VIDEO DISPLAY 21 and PRINTER 29 as examples of display means upon which the operator and others can view resulting images, as well as operational information about the imaging system and its operation.

FIG. 2 shows values obtainable from scanning a two-by-two image array with values 1, 2, 3, 4 in upper left, upper right, lower right, and lower left cells. That ordered (monotonic) sequence can be obtained by scanning the array clockwise, alternating direction row-by-row between left-to-right and right-to-left (no fly-back). If scanned counter-clockwise, from the same upper left cell, the order would become 1, 4, 3, 2. Scanned row-by-row, left-to-right, the sequence would be 1, 2, 4, 3. Scanned column-by-column from top-to-bottom and left-to-right would yield the sequence 1, 4, 2, 3. Criss-cross scanning could give 1, 3, 2, 4 and 1, 3, 4, 2. Each other integer as first gives six more sequences (twenty-four total).

According to this invention, each of the sequences from FIG. 2 can be considered a single number, as could subsets of any sequence or supersets composed of a multiplicity of sequences wherein this four-numbered array was only one of many to be processed similarly.

FIG. 2 shows in schematic and tabular form ARRAYED VALUES from the scanning of a simple 2×2 array, as shown in both decimal and 8-bit binary form. The resulting value array exhibits values 1, 2, 3, 4 when read in clockwise order beginning at the upper left cell. Tabulated below are resulting numerical value sequences resulting from that scanning pattern, the decimal ones in a column at the left, and the binary ones at the right, spaced laterally apart by an intermediate column of briefly stated scanning sequence clues.

The half dozen possible decimal sequences (from the upper left) are (a) 1,2,3,4; (b) 1,4,3,2; (c) 1,2,4,3; (d) 1,4,2,3; (e) 1,3,2,4; and (f) 1,3,4,2. The corresponding binary sequences are longer: (a) 00000001, 00000010, 00000011, 000000100; (b) 00000001, 00000100; 00000011, 00000010; (c) 00000001, 00000010, 00000100, 00000011; (d) 00000001, 00000100, 00000010, 00000011; (e) 00000001, 00000011, 00000010, 00000100; and (f) 00000001, 00000011, 00000100, 00000010.

It will be apparent that an equal number of sequences (six) would be generated by starting at another cell value, whereupon the initial values of those sequences would be, respectively, 2, 3, and 4 (decimal)—and the corresponding values in binary notation. Another numeric base, such as hexadecimal, might be used if desired.

An aspect of the invention is concatenation or linking of the sequences of image data numeric values into larger integral numbers, each resulting integer corresponding to one or more array sequences. Once concatenation of the numeric values from scanning of a four-cell array is understood, concatenation of longer array sequences or of multiple arrays should be readily apparent. (See example below.)

For sequence (a) the decimal number would be 1234, whereas the corresponding binary number is 00000001000000100000001100000100, equal to decimal 33,818,120 as the sum of binary values for each "1" in the sequence $2^3$, $2^9$, $2^{10}$, $2^{18}$, $2^{25}$=(8+512+1024+262,144+33,554,432). The positional sequence of non-zero digits: 3, 9, 10, 18, 25—counting from the least significant digit, which is at the right in binary (as in decimal) notation—can be useful in error detection/correction, as considered in a later section.

A preferred method for partitioning linked numbers derived from the matrix in FIG. 2 (1234, 1243, 1324, 1342, 1423, 1432) follows. For simplicity it is assumed that the first numeric value allowable in the partition is one, and that the highest value is to be the last term in the next higher fully packed partitioning—which for the first two numbers is 1275 (fully packed at 50 terms), for the third number is 1326 (fully packed at 51 terms), for the fourth number is 1378 (fully packed at 52 terms), for the fifth number is 1431 (fully packed at 53 terms), and for the sixth number is 1485 (fully packed at 54 terms). The partition is to be packed from the highest term downward until the next term would exceed the number being partitioned, then that term is skipped, and the highest possible smaller terms are selected to make up the rest of the number being partitioned—which they do in patterned ways from number to number.

Hence, for the first two numbers, 1234 and 1243, the terms to be omitted must total 1275−1234=41 and 1275−1243=32, respectively. As the partition of 36 is fully packed by 1, 2, 3, 4, 5, 6, 7, and 8, inclusion of the single term 4 from the sequence of terms 1 to 8, to give the sequence 4, 9, 10, 11, . . . 50, partitions the number 1243 and can be represented by $[43,1243]_4^{50}$. Similarly, the fully packed nine-term partition for the number 45 is four more than need be omitted, so inclusion of 4 from it in the sequence 4, 10, 11 . . . 50 partitions the number 1234 and can be represented as $[42,1234]_4^{50}$.

In like manner partitions can be derived for the other numbers. For 1324 the partition is 1, 3, 4 . . . 51 represented as $[50,1324]_1^{51}$. For 1342 the partition is 9, 10 . . . 52, represented as $[44,1342]_9^{52}$. For 1423 the partition is 1, 2 . . . 7, 9, 10 . . . 53, or $[52,1423]_1^{53}$, and for 1432 the partition is 2, 11, 12 . . . 54, or $[45,1432]_2^{54}$.

The bracketed representations of the numbers correspond to the relatively small amount of information required to be input to store the terms making up the partitioning of the numbers. This method of coding the data to be stored is simple, efficient, and lossless.

FIG. 3 shows, in schematic flow diagram form, the main steps of image-input or storage method 100 of this invention. Basic steps are to SCAN 106 IMAGE FIELD 102 containing something of interest, here represented by stick FIG. 101, as an ARRAY 104 of picture elements (pixels), and to SENSE 107 at each pixel a characteristic of interest, and also to EVALUATE 108 the sensed characteristic numerically—as analog (A) or digital (D)—VALUES 109 thereof. The next steps according to this invention are to CONCATENATE 110 the numerical values, and (if analog) to CONVERT A/D 112 (to digital), also to STORE NUMBER 123, itself denoted as NUMBER 130.

Further steps in FIG. 3 are to PARTITION 114 stored NUMBER 130 into an ordered set of numerical terms that sum to that number, to STORE TERMS 124 (that specific set) as TERMS 140, also to TABULATE 115 the terms, and to STORE TABLE 125 of them as TABLE 150. Common coding (e.g., compression) may be performed here mainly to conserve storage space, but here coding means primarily derivative processing such as may be especially conducive to error detection/correction. Such steps (dashed lines) include CODE & STORE 165—derivatives thereof, such as $\Sigma DIGIT^2$ 135 (sum of squared non-zero digits of NUMBER 130), STATS 145 from statistical analysis of TERMS 140 (such as their mean and standard deviation or variance), and/or alternative table ALT. TABLE 155 derived from TERMS 140 by at least one other method, such as bottom-up (instead of top-down) partition packing, or change in either actual or computed scanning order. Subsequent decoding may—but need not—be deferred until retrieval.

FIG. 4 indicates schematically image-output or retrieval steps 200 of this invention, as the inverse of the foregoing input steps. The step RETRIEVE AND/OR RECOMPUTE 220 draws from the items already stored (or recomputes one or more from one or more of the others), such as NUMBER' 230, partition TERMS' 240, TABLE' 250, $\Sigma DIGIT^{2'}$ 235, STATS' 245, and ALT. TABLE' 255. (The primes note that these items may not be identical with the previous unprimed counterparts.)

If any of the last mentioned (or other) derivative items were coded for storage, it is usual to DECODE 260 (dashed lines) them at this stage. They and the other stored items (bracketed here) are then subjected to COMPARE DATA 270 in a DETECT ERRORS 280 loop (at right) and—where an error is detected—a CORRECT ERRORS 285 loop (at left), wherein error-free NUMBER" 330 is identified by cross-checking concurrence as identical to stored NUMBER 130 (in FIG. 3).

Then, as suggested above, FIG. 4 schematically retraces steps (of the 200 series) in inverse order and function of the steps (of the 100 series) in that preceding view, as follows: to UNLINK 210, thus decatenating or unlinking retrieved NUMBER" 330—which should now be identical with NUMBER 130—and converts its smaller numerical components into retrieved VALUES' 209, in either digital (D)— or via CONVERT D/A 212—analog form, whichever better suits the actuator being used. The final steps are to PROPORTIONATE 208 (setting the reproducing means) to ACTUATE 207 and MAP 206, sweeping (as suggested by arrows) ARRAY 204, and thereby producing stick figure image 201 in COPY FIELD 202 as a replica of starting stick figure (101) in the original image field (102). Subject to the precision of the replication equipment, the original resolution can at least be equaled, whereupon a printed copy should be an exact replica and should be as helpful as to the user as the original itself could be.

No unusual apparatus is required to practice this invention, and an operative set of physical components can be obtained readily in the marketplace. The user or operator has considerable control over the process and can tailor it to suit particular circumstances.

The lossless imaging of this invention has obvious benefits. Whether to accept such resolution as is readily available or to demand very high levels of resolution, and whether to manipulate numbers of ordinary size in ordinary computational times or to process very large numbers or very rapidly (or both) are matters of choice.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The claimed invention:

1. An imaging system, comprising the combination of scanning means adapted to scan an image field as an array of image pixels in a preselected order, the image pixels having a characteristic adapted to be evaluated numerically;

evaluative means adapted to evaluate the given characteristic of each of the pixels, in the scanned order, to produce at least one set of successive numerical image data values;

linking means adapted to concatenate each set of numerical image data values into a single corresponding linked image data integral number;

partition means adapted to partition each linked image data integral number into at least one image partition set of numerical terms summing to that number, any numerical partition term being present only once within any single resulting partition set; and storage means adapted to store foregoing numerical data representing said at least one image partition set of numerical terms, pending subsequent retrieval thereof and consequent image replication.

2. Imaging system according to claim 1, including conversion means adapted to convert non-binary numerical data to corresponding binary form with preselected number of digits per pixel for storage.

3. Imaging system according to claim 1, including retrieval means comprising recovery means adapted to recover each linked image data integral number;

unlinking means adapted to separate each linked image data integral number into the successive numerical image data values from which it was concatenated;

reconversion means adapted to convert the recovered succession of numerical image data values into signals to display means, and display means including a receptive medium and adapted to map onto that medium the recovered signals in an array of pixels having the characteristic values of the corresponding pixels located as in the original array, thereby replicating the image field.

4. Imaging system according to claim 3, wherein the storage means includes a table of numerical partition terms summing to a given largest integer in a set of successive numerical values, and wherein the recovery means is adapted to identify therefrom any partitioned image data integral number having partition terms not exceeding that largest integer.

5. Imaging system according to claim 3, including also coding means adapted to formulate for each set of partition terms a plurality of numerical derivatives thereof for storage, error-detection means adapted to compare respective values of respective stored derivatives and further adapted to flag any discrepancy noted therebetween, error-correction means adapted to review detected discrepant derivatives and further adapted to determine which is accurate, and decoding means adapted to recover coded data from a stored derivative and so to identify a stored image data integral number.

6. In an imaging system including means evaluative of an image to provide sets of successive binary numerical data values of image characteristics of interest, means to store data values, and means to retrieve stored data values, the improvement comprising linking means adapted to concatenate each set of successive image data numerical values into a linked image data integer not exceeding N as a preselected largest permissible numerical value;

partition means adapted to partition each linked image data integer into at least one set of integral terms summing to that integer, any given term being present only once in the set;

unlinking means to decatenate each linked image data integer, when retrieved, into successive unlinked data values;

means adapted to restore the successive stored data values from the retrieved successive unlinked data values; and graphic reproduction means to convert the restored data values into a replica of the image having the characteristics of interest.

7. Imaging system according to claim 6, including component tabulating means adapted to provide for each partitioned integer a lookup table of partition terms of integers not exceeding N as a preselected maximum value.

8. Imaging system according to claim 6, including component partitioning means for computing partition terms of each partitioned integer not exceeding a maximum size of N.

9. Imaging system according to claim 6, including component coding means adapted to provide, as a checksum derivative of each linked image data integer, the sum of the squares of the numerical values of the non-zero digits of that integer.

10. Imaging system according to claim 6, including component computing means adapted to compute, as a statistical derivative of each set of partition terms, their standard deviation or variance.

11. An imaging method, comprising the steps of scanning, in a preselected order, an image field as an array of image pixels having a characteristic to be evaluated numerically;

evaluating the given characteristic of each of the image pixels in the scanned order, and thereby producing a set of successive numerical image data values;

concatenating the resulting set of successive numerical image data values, in binary form, into a linked image data integer;

partitioning the linked image data integer into at least one set of terms summing to that integer, any given term being present only once within any given set;

storing the partition terms for that integer pending subsequent retrieval of the stored data and display of the resulting image.

12. Imaging method according to claim 11, including steps of error detection including comparing the partition terms of each linked integer as retrieved with the corresponding stored partition terms.

13. Imaging method according to claim 12, including the step of computing partition terms for respective linked integers each not exceeding a preselected maximum integer size of N.

14. Imaging method according to claim 12, including the step of referring to a lookup table for the stored partition terms of respective linked integers, each not exceeding a preselected maximum design value of N.

15. Imaging method according to claim 11, including the step of coding a plurality of the following derivatives:

(a) a scanning derivative, featuring the same set of successive evaluated numerical values in an alternative order corresponding to an alternative scanning pattern;

(b) a statistical derivative, featuring the standard deviation of the set of partition terms of any given partitioned integer;

(c) a checksum derivative, featuring the sum of the squares of the non-zero digit values, in a set of ordered partition terms including any zero digits, concatenated into a single linked integer.

16. Imaging method according to claim 15, including a step of error detection involving comparing values of at least one of the derivatives and noting any discrepancy in the compared values.

17. Imaging method according to claim 15, including steps of error correction involving also comparing corresponding values of at least one more derivative, excluding a single discrepant derivative value from further use in the method after obtaining non-discrepant comparison for at least one derivative.

18. Imaging method according to claim 11, including steps of retrieving the linked integer, unlinking it into the succession of numerical values that were concatenated to form it, converting the recovered succession of numerical values into signals to display an array of pixels having the characteristic values of corresponding pixels as located in the original array, and displaying the resulting image.

19. Imaging method according to claim 18, including displaying the image on a non-permanent image video screen.

20. Imaging method according to claim 18, including displaying the image as printing on a tangible sheet of material.

21. The improvement in an imaging system according to claim 6, including coding means adapted to produce from the partition terms at least one derivative available for error-detection comparison.

22. Imaging method according to claim 11, wherein the image field is pictorial, the scanned characteristic is optical density, and including the steps of retrieving and re-displaying the image.

* * * * *